United States Patent
Enomoto (10) Patent No.: US 9,697,343 B2
(45) Date of Patent: Jul. 4, 2017

(54) REWARDING SYSTEM

(71) Applicant: Kabushiki Kaisha Toshiba, Tokyo (JP)

(72) Inventor: Nobuyoshi Enomoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/215,113

(22) Filed: Mar. 17, 2014

(65) Prior Publication Data

US 2014/0281580 A1    Sep. 18, 2014

(30) Foreign Application Priority Data

Mar. 18, 2013    (JP) .................... 2013-055562

(51) Int. Cl.

| | |
|---|---|
| G06F 21/32 | (2013.01) |
| G06F 17/30 | (2006.01) |
| G06Q 20/40 | (2012.01) |
| G06Q 20/00 | (2012.01) |
| G06Q 30/00 | (2012.01) |
| G06Q 30/02 | (2012.01) |

(52) U.S. Cl.
CPC ........ *G06F 21/32* (2013.01); *G06F 17/30386* (2013.01); *G06Q 20/00* (2013.01); *G06Q 20/40145* (2013.01); *G06Q 30/01* (2013.01); *G06Q 30/02* (2013.01)

(58) Field of Classification Search
CPC .. G06F 21/32; G06F 17/30386; G06F 21/602; G06Q 20/40145; G06Q 30/02; G06Q 30/01; G06Q 20/00
USPC .................................................... 713/186
See application file for complete search history.

(56) References Cited

U.S. PATENT DOCUMENTS

| | | | | |
|---|---|---|---|---|
| 7,620,978 | B1 * | 11/2009 | Reddy | G06F 21/41 713/168 |
| 8,374,588 | B2 * | 2/2013 | Hurst | G06Q 30/02 455/414.1 |
| 2002/0184538 | A1 * | 12/2002 | Sugimura | G06F 21/32 726/5 |
| 2003/0182585 | A1 * | 9/2003 | Murase | G06F 21/32 726/3 |
| 2007/0140145 | A1 * | 6/2007 | Kumar | G06F 21/32 370/254 |
| 2007/0177807 | A1 * | 8/2007 | Enomoto | 382/224 |
| 2008/0240579 | A1 * | 10/2008 | Enomoto | 382/224 |
| 2013/0290136 | A1 * | 10/2013 | Sheets | G06Q 30/0609 705/26.35 |

* cited by examiner

*Primary Examiner* — Theodore C. Parsons
*Assistant Examiner* — Thomas Ho
(74) *Attorney, Agent, or Firm* — Baker Botts L.L.P.

(57) ABSTRACT

An information processing method of convenience and an information processing system are disclosed. In some embodiments, the system includes acquiring a 1st attribute information from a person with a personal digital assistant that contains a 2nd attribute information; acquiring the 2nd attribute information from two or more personal digital assistants; comparing the acquired 1st attribute information with the acquired 2nd attribute information to form countervalue information; and storing the countervalue information in the personal digital assistant of the person from which the 1st attribute information was acquired.

3 Claims, 3 Drawing Sheets

REWARDING SYSTEM

CROSS-REFERENCE TO RELATED APPLICATION

This application is based on and claims the benefit of priority to Japanese Application No. P2013-055562, filed on Mar. 18, 2013, the entire contents of which are incorporated herein by reference.

FIELD

The embodiment of the present disclosure is related to an information processing method and an information processing system.

BACKGROUND

Biometrics are collected from candidates for collection, such as a passing person and a user of institutions, the collected information is analyzed statistically, and there is the method of information processing which guesses the tendency of a passing person and a user. Furthermore, based on the guessed tendency, there is a method of providing a user with the information for which a user searches.

SUMMARY

By the above-mentioned method, a countervalue cannot be given to the candidate for collection having collected biometrics. The structure for giving the countervalue to collection of biometrics to the candidate for collection is demanded.

The purpose of the present disclosure is to offer the high information processing method of convenience, and an information processing system.

BRIEF EXPLANATION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

Figure 1:
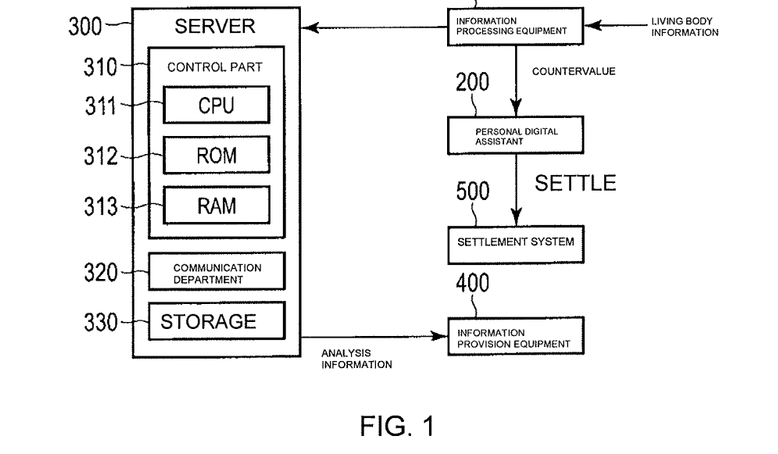
FIG. 1 is a figure for explaining the information processing system concerning 1 embodiment.

Hereafter, the information processing method and the embodiment of an information processing system are explained in detail, referring to drawings. FIG. 1 shows the example of the composition of the information processing system 1 concerning 1 embodiment. The information processing system 1 is equipped with at least one or more sets of the information processing equipment 100, the personal digital assistant 200, the server 300, the information provision equipment 400, and the settlement system 500. The information processing equipment 100 and the server 300 are mutually connected through the network in the state which can transmit and receive data. Moreover, the information processing equipment 100 and the information provision equipment 400 of each other are connected through the network in the state which can transmit and receive data.

The information processing system 1 collects biometrics from candidates for collection, such as a passing person and an institution user, analyzes the collected information statistically, and generates analysis information. The information processing system 1 can offer the information nearer to a user's needs by changing the information with which a user is provided based on analysis information.

Furthermore, the information processing system 1 can supply a countervalue to the candidate for collection which collected biometrics.

The information processing equipment 100 collects biometrics from candidates for collection, such as a passing person and an institution user (a user). The information processing equipment 100 receives a person's (candidate for collection) picture (biometrics) from the camera installed in a store, near the entrance of institutions, etc., and generates attribute information (1st attribute information) using the received picture. Moreover, the information processing equipment 100 supplies a countervalue to the personal digital assistant 200, which the candidate for collection of the biometrics possesses. Moreover, the information processing equipment 100 transmits the 1st attribute information to the server 300.

The information processing equipment 100 collects collectable information as biometrics, without a user being conscious.

The information processing equipment 100 collects a person's face, body temperature, a blood flow, breathing, or cardiac beats as biometrics, for example. Furthermore, the information processing equipment 100 generates the 1st attribute information based on a user's biometrics. Attribute information is information for classifying a person, and is information which cannot specify an individual. The information processing equipment 100 can generate various attribute information by analyzing biometrics.

For example, the information processing equipment 100 can generate attribute information, including the user's sex, an age, and a face, the existence of glasses, the existence of a mask, expression, health condition, etc., based on biometrics.

The personal digital assistant 200 is a terminal which the candidate for collection possesses. The personal digital assistant 200 is an electronic device equipped with a display, a final controlling element, and the communication part, for example. The personal digital assistant 200 is a cell phone unit, tablet type PC, a portable music player, or other electronic devices, for example. The personal digital assistant 200 transmits the attribute information (2nd attribute information) memorized beforehand to the information processing equipment 100 according to the demand from the information processing equipment 100. Moreover, the personal digital assistant 200 memorizes the countervalue information supplied from the information processing equipment 100. Furthermore, the personal digital assistant 200 can communicate with the settlement system 500, and can use countervalue information for settlement of accounts.

The server 300 memorizes the 1st attribute information transmitted from the information processing equipment 100. In addition, the server 300 matches and memorizes the time by which the setting position of the information processing equipment 100 which transmitted the 1st attribute information to the 1st attribute information, and the 1st attribute information were generated, and other information. Furthermore, the server 300 generates the analysis information which shows a user's tendency for every setting position of the information processing equipment 100. The server 300 transmits analysis information to the information provision equipment 400.

The information provision equipment 400 is installed in the same point or neighborhood as the camera which supplied the picture to the information processing equipment 100. The information provision equipment 400 is a display, a speaker, and an electronic device equipped with the communication part, for example. The information provision equipment 400 outputs either of two or more kinds of advertisements set up beforehand with a display and a speaker. Thereby, the information provision equipment 400 can notify a passing person, an institution user, etc., of an advertisement. For example, the information provision equipment 400 chooses the advertisement to output based on the analysis information supplied from the server 300. Thereby, the information provision equipment 400 can notify of the advertisement nearer to a user's needs.

The settlement system 500 can settle a charge. The settlement system 500 is a register installed in a store, or equipment which settles accounts on a network. The settlement system 500 can read the countervalue information memorized by the personal digital assistant 200 by communicating with the personal digital assistant 200. Furthermore, the settlement system 500 is used for settlement of accounts using the countervalue information.

As for the server 300, the server 300 is equipped with the control part 310, the communication part 320, and the storage 330.

The control part 310 functions as a control part which controls operation of each part of the server 300. The control part 310 is equipped with CPU311, ROM312, RAM313, etc. The control part 310 performs various processings based on the information inputted through the communication part 320.

CPU311 is equipped with the operation element etc. which perform various operation processing. CPU311 realizes various functions by executing the program memorized by ROM312. ROM312 memorizes the program for controlling the server 300, the program for realizing various kinds of functions, etc. RAM313 functions as a work memory of CPU311.

That is, RAM313 memorizes the operation result of CPU311, the data read by CPU311, etc.

The communication part 320 can communicate with other apparatus on networks, such as the Internet, by LAN. Thereby, the server 300 can communicate with the information processing equipment 100 installed on the network.

The storage 330 is equipped with a hard disk drive (HDD), a solid-state drive (SSD), or other memory storage. The control part 310 can make the storage 330 memorize various information received through the communication part 320. As described above, the server 300 memorizes the 1st attribute information transmitted from the information processing equipment 100 to the storage 330.

The server 300 is installed in the physically distant place in the information processing equipment 100. The server 300 has an address for connection for external apparatus to access the server 300 through networks, such as URL for intranet or the Internet. The information processing equipment 100 can transmit data to the server 300 by general-purpose network communication protocols, such as exclusive use or HTML. That is, the server 300 can receive data from the information processing equipment 100 through a network by the communication part 320.

Furthermore, the server 300 acquires the time and the goods sales information that the setting position of the information processing equipment 100 and the 1st attribute information were generated, institution use information, etc. from the information processing equipment 100, when the 1st attribute information is received from the information processing equipment 100. It may be transmitted to the server 300 from the information processing equipment 100, and the server 300 may generate the time by which the setting position of the information processing equipment 100 and the 1st attribute information were generated, and institution use information at the time of reception of the 1st attribute information.

Goods sales information is collectively generated, when the information processing equipment 100 generates the 1st attribute information.

The information processing equipment 100 specifies what the person subject to the biometrics collection purchased at the store in order to generate the 1st attribute information.

The information processing equipment 100 generates goods sales information using the specified information.

The server 300 matches with the 1st attribute information the time (time information) and the goods sales information that the information (place information) and the 1st attribute information which show the setting position of the information processing equipment 100 which transmitted the 1st attribute information were generated, institution use information, etc., and memorizes them to the storage 330.

In addition, the server 300 does not need to match place information, time information, goods sales information, and all the institution use information with the 1st attribute information. The server 300 is a pair to the 1st attribute information about place information at least.

The server 300 generates and memorizes the information for connection on the link etc. which can refer to the 1st attribute information.

That is, the server 300 can supply the information matched with the 1st [according to the information for connection] attribute information, and the 1st attribute information to external apparatus, when external apparatus requires read-out of the 1st attribute information using the information for connection through a network.

Furthermore, CPU311 of the server 300 functions as an analysis part (analysis means) which analyzes the 1st attribute information that it collected by executing the program memorized by ROM312.

In addition, the information processing system 1 may be composition equipped with the hardware which can realize the function which is independently [the server 300] equivalent to an analysis part.

The server 300 inputs two or more 1st collected attribute information into an analysis part. For example, the server 300 inputs the 1st collected attribute information into an analysis part for every definite period of time.

Thereby, the analysis part can generate analysis information for every definite period of time.

For example, the analysis part of the server 300 totals the frequency of appearance of a sex, and the frequency of appearance of an age for every place and every time.

Thereby, the analysis part can guess an age and sex with a high possibility of existing in time to be in a certain place.

Moreover, for example, when goods sales information is matched with the 1st attribute information, the analysis part can total the sales of every place and the goods for every time for every classification of goods.

Furthermore, the analysis part can guess the frequency of appearance for every age and the frequency of appearance for every sex, the sales of various goods, and the correlation of A. Thereby, the analysis part can presume the classification of the high goods of a user's needs for every place, every sex, and every age, and can generate analysis information.

For example, when this analysis information is supplied to a store, at a store, the high goods of a user's needs can be recognized for every time zone.

Thereby, at a store, goods can be more effectively sold by responding to analysis information, and buying in and displaying goods.

Moreover, for example data (advertising data) for the information provision equipment 400 to output two or more advertisements for two or more goods is memorized beforehand.

The information provision equipment 400 can output the advertisement of high goods of a user's needs based on the analysis information supplied from the server 300.

Furthermore, the information provision equipment 400 can recognize the high goods of a user's needs for every time zone.

Thereby, the information provision equipment 400 can output the advertising information on the high goods of a user's needs for every time zone based on analysis information.

Moreover, for example, when an institution uses information that is matched with the 1st attribute information, the analysis part can guess the frequency of appearance for every age, and the frequency of appearance for every sex for every place (institution) and every time.

Thereby, the analysis part can presume the institution of a user's high needs for every time zone, every sex, and every age, and can generate analysis information.

For example, when this analysis information is supplied to an institution, with an institution, the rate of a user's sex, the deviation of an age, etc., can be recognized.

With an institution, service can be raised by adjusting an operating ratio according to analysis information.

Figure 2:
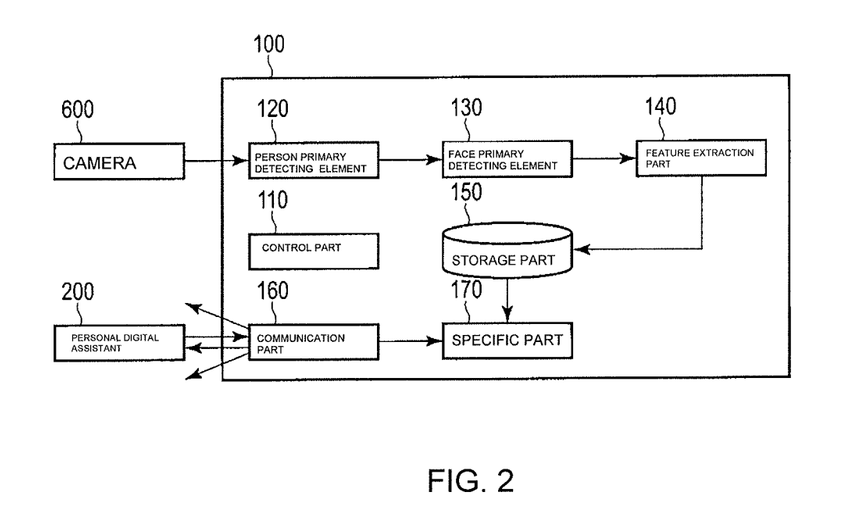
FIG. 2 is a figure for explaining the information processing system concerning 1 embodiment.

FIG. 2 shows the example of the composition of the information processing equipment 100.

The information processing equipment 100 is equipped with the control part 110, the person primary detecting element 120, the face primary detecting element 130, the feature extraction part 140, the storage part 150, the communication part 160, and the specific part 170.

The control part 110 functions as a control part which controls operation of each part of the information processing equipment 100.

The control part 110 is equipped with CPU, ROM, RAM, etc.

The control part 110 performs various processings based on the information inputted through the communication part 160.

CPU is equipped with the operation element, etc., which perform various operation processings.

CPU realizes various functions by executing the program memorized by ROM.

ROM memorizes the program for controlling the information processing equipment 100, the program for realizing various kinds of functions, etc.

RAM functions as a work memory of CPU.

That is, RAM memorizes the data, etc., which were read by the operation result of CPU, and CPU.

By executing the program memorized by ROM, CPU of the control part 110 acquires biometrics, and functions as an attribute information generation part (attribute information generation means) which generates the 1st attribute information based on biometrics. The person primary detecting element 120, the face primary detecting element 130, and the feature extraction part 140 are a part of functions of an attribute information generation part.

In addition, the example which uses a user's picture as biometrics is explained here.

The information processing equipment 100 receives biometrics from the camera 600.

The camera 600 is installed in the place which collects the 1st attribute information.

The camera 600 is an industrial television (ITV) camera installed a store, near the entrance of institutions, etc., for example.

The camera 600 is Charge Coupled Device (CCD) or Complimentary Metal Oxide Semiconductor (CMOS).

Photo acceptance units, such as Complimentary Metal Oxide Semiconductor (CMOS), are equipped with the sensor and optical system which were arranged.

A photo acceptance unit—euphotic—the bottom changes light into an electric signal (a picture is called below), i.e., digital imaging.

An optical system is a lens or an optical guiding component, for example—the predetermined range to light—euphotic—it has the composition which makes a photo acceptance unit the bottom image light.

The camera 600—an optical system—euphotic—the bottom generates the data of a picture from light.

Thereby, the camera 600 can acquire the picture of the user who passes through a store, the entrance of institutions, etc.

The camera 600 can acquire a user's picture, when a user approaches a store, the entrance of institutions, etc., for example.

Moreover, the camera 600—euphotic—video is also acquirable by the bottom changing light into a picture continuously.

In this case, the camera 600 supplies video to the information processing equipment 100.

The information processing equipment 100 performs processing later mentioned for every frame of the video supplied from the camera 600, or fixed frame.

The person primary detecting element 120 detects the domain (person area) to which the person is reflected in the picture, when a picture is received from the camera 600.

The person primary detecting element 120 detects the domain where an object exists, and the domain where the object near the template set up beforehand exists as a person area, for example.

The face primary detecting element 130 detects the picture (face picture) of the domain (face domain) to which the person's face is reflected from the inside of a person area.

The face primary detecting element 130 transmits the detected face picture to the feature extraction part 140.

The face primary detecting element 130 computes a correlation value, moving the template beforehand prepared in the inside of a picture, for example.

The face primary detecting element 130 pinpoints the domain where the highest correlation value was computed with a face domain.

Thereby, the face primary detecting element 130 can detect the face picture of the face domain in which the person's face is reflected.

In addition, the face primary detecting element 130 transmits the detected face picture to the feature extraction part 140 in case that the face pictures are detected continuously from two or more frames, in order to prevent incorrect detection of a face picture. When a face picture is detected, a face picture is supplied to the feature extraction part 140.

In addition, the face primary detecting element 130 may be the composition of detecting a face picture by detecting the position of face parts, such as eyes and a nose, out of image data.

Moreover, the face primary detecting element 130 may be the composition of memorizing the face pattern when the person has worn a mask, sunglasses, or a hat beforehand as a template so that a face picture can be detected, even when the person is wearing a mask, sunglasses, or a hat.

The feature extraction part 140 extracts the face feature (facial feature) based on a face picture. The face feature is the feature information which can identify an individual.

The feature extraction part 140 is good as what treats the shade information on a face picture as a face feature, for example, and extracts the shade value of the domain of an m fsfNfZf<f‰ n pixel as a feature vector of an m f‰ n dimension. Moreover, the feature extraction part 140 is good as what can extract the face feature from an above-mentioned feature vector, for example by using subspace method, etc.

Furthermore, based on the extracted face feature, the feature extraction part 140 distinguishes the attribute of the person for collection (user), and generates the 1st attribute information.

The feature extraction part 140 matches the 1st generated attribute information and face feature, and memorizes them to the storage part 150.

In addition, with this embodiment, the feature extraction part 140 distinguishes direction of sex, an age, and a face, the existence of glasses, the existence of a mask, expression, health condition, etc., as an attribute.

However, the feature extraction part 140 may be composition which distinguishes the attribute of further others.

For example, the feature extraction part 140 distinguishes above various attributes based on the position of the part of a face, the number of wrinkles, a part peculiar to sex, a frame, etc.

The storage part 150 is equipped with a hard disk drive (HDD), a solid-state drive (SSD), or other memory storage.

The storage part 150 memorizes the 1st attribute information and face feature that were supplied from the feature extraction part 140.

Moreover, the control part 110 generates countervalue information, when the 1st attribute information is stored in the storage part 150.

Countervalue information is a point which can be used for settlement of accounts instead of money at settlement of accounts, for example.

The control part 110 generates the countervalue information set up beforehand, for example.

The control part 110 matches the generated countervalue information with the 1st attribute information, and memorizes it to the storage part 150. In addition, the control part 110 may be the composition of choosing the thing according to attribute information from two or more countervalue information set up beforehand, matching the selected countervalue information with the 1st attribute information, and memorizing it. Thereby, the control part 110 can supply the countervalue information according to the user's needs more.

The communication part 160 can communicate with the personal digital assistant 200 by short-distance wireless communications.

The communication part 160 communicates with the personal digital assistant 200 by Bluetooth (registered trademark), short-distance wireless LAN, or infrared transmission, for example.

Thereby, the information processing equipment 100 can supply countervalue information to the personal digital assistant 200.

The specific part 170 can specify the personal digital assistant 200 which supplies countervalue information. For example, two or more personal digital assistants 200 may exist within limits which can communicate the communication part 160.

In such a case, the specific part 170 specifies the personal digital assistant 200 which the user who was the collection target of biometrics possesses out of two or more personal digital assistants 200.

The specific part 170 communicates with two or more personal digital assistants 200 by the communication part 160, and acquires the 2nd attribute information from the personal digital assistant 200.

The specific part 170 memorizes the 2nd acquired attribute information.

The 1st attribute information memorized by the part 150 is compared.

The specific part 170 specifies the one personal digital assistant 200 based on the result of comparison. For example, the specific part 170 specifies the personal digital assistant 200 which has the 2nd attribute information with most attributes which are in agreement with the 1st attribute information.

The control part 110 supplies countervalue information by the communication part 160 to the personal digital assistant 200 specified by the specific part 170. That is, the control part 110 is supplied to the personal digital assistant 200 which specified the countervalue information matched with the 1st attribute information used for comparison. Thereby, the information processing equipment 100 can supply countervalue information to the personal digital assistant 200 which the user who offered biometrics possesses.

Figure 3:
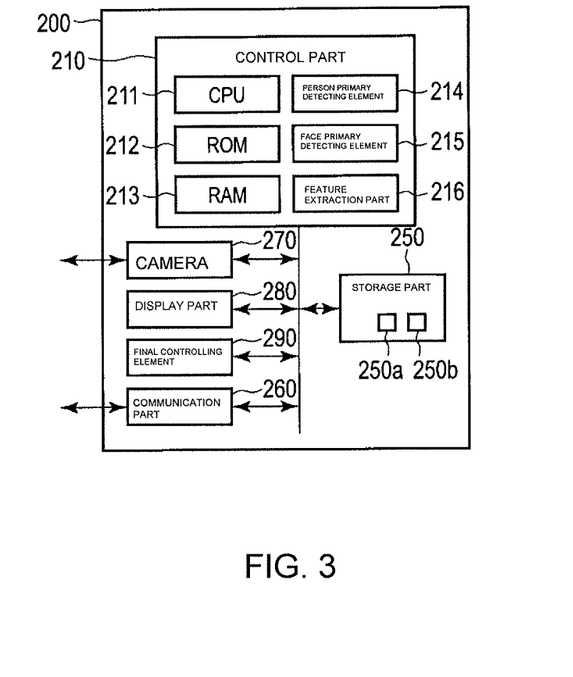
FIG. 3 is a figure for explaining the information processing system concerning 1 embodiment.

FIG. 3 shows the example of the composition of the personal digital assistant 200. The personal digital assistant 200 is equipped with the control part 210, the storage part 250, the communication part 260, the camera 270, the display part 280, and the final controlling element 290.

The control part 210 functions as a control part which controls operation of each part of the personal digital assistant 200. The control part 210 is equipped with CPU211, ROM212, RAM213, etc. The control part 210 performs various processings based on the signal supplied from the final controlling element 290.

CPU211 is equipped with the operation element, etc., which perform various operation processings. CPU211 realizes various functions by executing the program memorized by ROM212.

ROM212 memorizes the program for controlling the personal digital assistant 200, the program for realizing various kinds of functions, etc. CPU211 starts the program memorized by ROM212 based on the signal supplied from the final controlling element 290.

Thereby, the control part 210 controls operation of each part.

RAM213 functions as a work memory of CPU211.

That is, RAM213 memorizes the operation result of CPU211, the data read by CPU211, etc.

Moreover, the control part 210 can generate picture signals, such as various screens, and can be made to display them on the display part 280 according to the application which CPU211 is performing.

The storage part 250 is equipped with a hard disk drive (HDD), a solid-state drive (SSD), or semiconductor memory.

The storage part 250 can memorize the program executed by CPU211 of the control part 210, application, various data, etc.

Moreover, the storage part 250 has the memory 250a which memorizes the 2nd attribute information used since the personal digital assistant 200 is specified with the information processing equipment 100, and the memory 250b which memorizes countervalue information.

The communication part 260 can communicate with the information processing equipment 100 by short-distance wireless communications.

The communication part 260 communicates with the information processing equipment 100 by Bluetooth (registered trademark), short-distance wireless LAN, or infrared transmission, for example.

Thereby, the personal digital assistant 200 can receive the countervalue information supplied from the information processing equipment 100.

The camera 270 is equipped with the sensor and optical system by which two or more photo acceptance units were arranged.

A photo acceptance unit—euphotic—the bottom changes light into an electric signal, i.e., a picture.

an optical system is a lens or a "±ŒÕ component, for example—the predetermined range to light—ŽóŒõ, μ and euphotic—it has the composition which makes a photo acceptance unit the bottom image light.

The camera 270—an optical system—euphotic—the bottom generates the data of a picture from light.

Thereby, the camera 270 can acquire the picture of the user who possesses the personal digital assistant 200.

The display part 280 is equipped with a liquid crystal display equipped with the liquid-crystal-display panel equipped with two or more pixels arranged in the shape of a matrix, for example, and the back light which illuminates this liquid crystal panel, etc. The display part 280 displays an image based on a picture signal.

The final controlling element 290 is a device which generates position information based on an electric capacity type sensor, a thermostat sensor, or other systems.

For example, the final controlling element 290 is formed in the display part 280 and one as a touch sensor.

The final controlling element 290 can generate a manipulate signal based on the operation on the screen currently displayed on the display part 280, and can supply it to the control part 210.

Moreover, the final controlling element 290 may be composition equipped with the key which generates a manipulate signal according to the operation input by a user, for example.

The final controlling element 290 generates a signal according to operation of a key, and supplies a manipulate signal to the control part 210.

Moreover, the personal digital assistant 200 is equipped with the power supply part which is not illustrated.

A power supply part is equipped with the terminal (for example, DC jack) for connecting with a battery and the adapter which receives electric power from commercial power etc.

A power supply part charges at a battery the electric power received from commercial power.

Moreover, a power supply part supplies the electric power charged by the battery to each part in the personal digital assistant 200.

Moreover, CPU211 of the control part 210 functions by executing the program of ROM212 as the person primary detecting element 214, the face primary detecting element 215, and the feature extraction part 216.

The person primary detecting element 214 is composition equivalent to the person primary detecting element 120 of the information processing equipment 100.

That is, the person primary detecting element 214 detects the domain (person area) to which the person is reflected in the picture, when a picture is received from the camera 270.

The person primary detecting element 214 detects the domain where the object near the template set up beforehand exists, for example as a person area.

The face primary detecting element 215 is composition equivalent to the face primary detecting element 130 of the information processing equipment 100.

That is, the face primary detecting element 215 detects the picture (face picture) of the domain (face domain) to which the person's face is reflected from the inside of a person area.

The face primary detecting element 215 transmits the detected face picture to the feature extraction part 216.

The face primary detecting element 215 computes a correlation value, moving the template beforehand prepared in the inside of a picture for example.

The face primary detecting element 215 pinpoints the domain where the highest correlation value was computed with a face domain.

Thereby, the face primary detecting element 215 can detect the face picture of the face domain in which the person's face is reflected.

In addition, the face primary detecting element 215 may be the composition of detecting a face picture by detecting the position of face parts, such as eyes and a nose, out of image data.

Moreover, the face primary detecting element 215 may be the composition of memorizing the face pattern when the person has worn a mask, sunglasses, or a hat beforehand as a template so that a face picture can be detected, even when the person is wearing a mask, sunglasses, or a hat.

The feature extraction part 216 is composition equivalent to the feature extraction part 140 of the information processing equipment 100.

That is, the feature extraction part 216 extracts the face feature (facial feature) based on a face picture.

The face feature is the feature information which can identify an individual.

The feature extraction part 216 can extract the face feature by using a partial space method (subspace method), etc., for example.

The feature extraction part 216 extracts the shade information on a face picture as a face feature, for example.

The feature extraction part 216 extracts the shade value of the domain of an m fsfNfZf<f‰ n pixel as a feature vector of an m f‰ n dimension.

It carries out.

Furthermore, based on the extracted face feature, the feature extraction part 216 distinguishes the attribute of the person for collection (user), and generates the 2nd attribute information.

The feature extraction part 216 matches the 2nd generated attribute information and face feature, and memorizes them in the memory 250a of the storage part 250.

In addition, with this embodiment, the feature extraction part 216 distinguishes direction of sex, an age, and a face, the existence of glasses, the existence of a mask, expression, health condition, etc., as an attribute.

However, the feature extraction part 216 may be composition which distinguishes the attributes of others.

For example, the feature extraction part 216 distinguishes above various attributes based on the position of the part of a face, the number of wrinkles, a part peculiar to sex, a frame, etc.

Thereby, the personal digital assistant 200 can generate the 2nd attribute information from the biometrics of the possessor of the personal digital assistant 200 beforehand, and can memorize it in the memory 250*a*.

Figure 4:
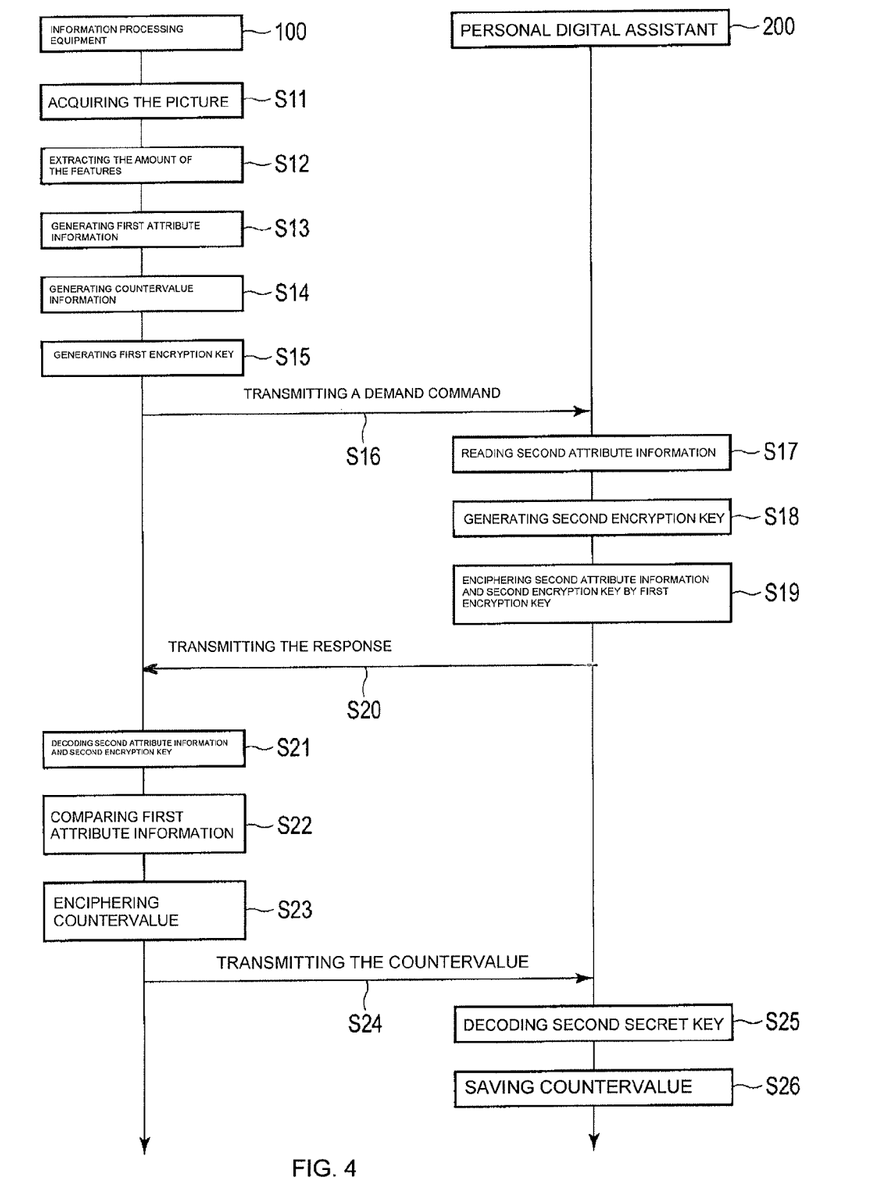
FIG. 4 is a figure for explaining the information processing system concerning 1 embodiment.

FIG. 4 shows the example of operation of the information processing system 1.

The information processing equipment 100 acquires the picture photographed with the camera 600 (Step S11).

The information processing equipment 100 extracts the amount of the features from the picture photographed with the camera 600 (Step S12).

That is, the information processing equipment 100 detects a face domain from the picture photographed with the camera 600, and extracts the face feature from the picture of a face domain.

Furthermore, the information processing equipment 100 generates the 1st attribute information based on the face feature (Step S13).

Furthermore, the information processing equipment 100 generates countervalue information (Step S14). The information processing equipment 100 matches the face feature used for generation of the 1st attribute information, countervalue information, and the 1st attribute information, and memorizes it to the storage part 150.

Moreover, the control part 110 of the information processing equipment 100 generates the 1st encryption key (Step S15). The 1st encryption key is an open encryption key used for RSA (Rives-Shamir-Adleman), an elliptic curve cryptosystem (ECC: Elliptic Curve Cryptosystem), or scrambling based on other standards, for example.

The control part 110 of the information processing equipment 100 generates a demand command. A demand command is a command which requires the 2nd attribute information of the personal digital assistant 200. The information processing equipment 100 adds the 1st encryption key to a demand command.

The information processing equipment 100 transmits a demand command to the personal digital assistant 200 (Step S16). The information processing equipment 100 outputs a demand command to the range of the communication part 160 to the communication part 160 which can be communicated. Thereby, the information processing equipment 100 can transmit a demand command to two or more personal digital assistants 200 which exist within limits [the communication part 160] which can be communicated simultaneously.

The personal digital assistant 200 reads the 2nd attribute information from the memory 250*a* of the storage part 250, when a demand command is received from the information processing equipment 100 (Step S17).

Furthermore, the personal digital assistant 200 generates the 2nd encryption key (Step S18). The 2nd encryption key is an open encryption key used for RSA (Rives-Shamir-Adleman), an elliptic curve cryptosystem (ECC: Elliptic Curve Cryptosystem), or scrambling based on other standards, for example.

The personal digital assistant 200 enciphers the 2nd attribute information and 2nd encryption key with the 1st encryption key (Step S19). The personal digital assistant 200 generates the response containing the 2nd attribute information and 2nd encryption key that were enciphered. The personal digital assistant 200 transmits the response containing the 2nd attribute information and 2nd encryption key that were enciphered to the information processing equipment 100 (Step S20).

The information processing equipment 100 decodes the 2nd attribute information and 2nd encryption key that are contained in the received response and that were enciphered using the 1st secret key corresponding to the 1st open encryption key, when the response transmitted from the personal digital assistant 200 is received (Step S21). Thereby, the information processing equipment 100 can acquire the 2nd attribute information that the personal digital assistant 200 holds, and the 2nd encryption key generated with the personal digital assistant 200.

The information processing equipment 100 compares the 1st attribute information memorized by the storage part 150 with the acquired 2nd attribute information (Step S22). The information processing equipment 100 specifies the personal digital assistant 200 which the user who offered the biometrics used for generation of the 1st attribute information possesses based on a comparison result.

Furthermore, the information processing equipment 100 enciphers countervalue information with the 2nd encryption key (Step S23).

The information processing equipment 100 transmits the countervalue information enciphered with the 2nd encryption key to the personal digital assistant 200 (Step S24).

That is, the information processing equipment 100 outputs the countervalue information enciphered with the 2nd encryption key to the range of the communication part 160 to the communication part 160 which can be communicated.

Thereby, the information processing equipment 100 can transmit the countervalue information simultaneously enciphered with the 2nd encryption key to two or more personal digital assistants 200 which exist within limits [the communication part 160] which can be communicated.

For example, the information processing equipment 100 recognizes having collected biometrics from the user of the personal digital assistant 200 with the 2nd attribute information, when the 1st attribute information that is in agreement with the 2nd acquired attribute information is memorized by the storage part 150. In this case, the information processing equipment 100 enciphers countervalue information with the 2nd encryption key enciphered together with the 2nd attribute information, and outputs it by the communication part 160.

Moreover, for example, the information processing equipment 100 computes the degree of similarity of the 2nd attribute information and the each 1st attribute information on the storage part 150 which were acquired, and judges whether the computed degree of similar is over the threshold value set up beforehand. The information processing equipment 100 may be composition which enciphers countervalue information with the 2nd encryption key enciphered together with the 2nd attribute information, and is outputted by the communication part 160, when the computed degree of similarity is over the threshold value set up beforehand.

The information processing equipment 100 enciphers the countervalue information set up beforehand with the 2nd encryption key, for example, and outputs it by the communication part 160.

Moreover, the information processing equipment 100 may be composition which enciphers the countervalue information which specifies the 2nd attribute information and the 1st attribute information that the degree of similarity is the highest, and is matched with the 1st specified attribute information with the 2nd encryption key, and is outputted by the communication part 160. Furthermore, the information processing equipment 100 may be composition which chooses one countervalue information from two or more countervalue information set up beforehand, enciphers the selected countervalue information with the 2nd encryption key based on the attribute which the 2nd attribute information has, and is outputted by the communication part 160.

In addition, the information processing equipment 100 performs processing of the above-mentioned Step S21 or Step S24 for every response, when a response is received from two or more personal digital assistants 200. Thereby, the information processing equipment 100 can supply countervalue information to all the personal digital assistants 200 which the user who was the collection target of biometrics possesses.

The personal digital assistant 200 is decoded using the 2nd secret key to the 2nd encryption key, when the enciphered countervalue information which was transmitted from the information processing equipment 100 is received (Step S25). Thereby, the personal digital assistant 200 can acquire countervalue information. The personal digital assistant 200 saves the acquired countervalue information in the memory 250b (Step S26). The personal digital assistant 200 reads countervalue information from the memory 250b according to the demand from the settlement system 500, and supplies it to the settlement system 500.

Thereby, the personal digital assistant 200 can use the acquired countervalue information for settlement of accounts.

In addition, the personal digital assistant 200 of the user who has not been the collection target of biometrics cannot be decoded even if it receives the countervalue information enciphered with the 2nd encryption key. For this reason, the information processing equipment 100 can supply countervalue information only to the personal digital assistant 200 which the user who is a candidate for collection of biometrics possesses.

As described above, the information processing equipment 100 collects a user's biometrics, and generates the 1st attribute information from biometrics. The server 300 can generate the analysis information which shows the deviation of the attribute of the user for every place based on the 1st attribute information, and can provide various kinds of institutions with analysis information. Furthermore, the information processing equipment 100 receives the encryption key generated with the personal digital assistant 200 which the user who was the collection target of biometrics possesses from the personal digital assistant 200, enciphers countervalue information with this encryption key, and supplies it to the personal digital assistant 200. The personal digital assistant 200 is decoded using the secret key corresponding to the encryption key which generated the enciphered countervalue information. Thereby, the personal digital assistant 200 can acquire the countervalue information which can be used for settlement of accounts with the settlement system 500.

Thus, the information processing system 1 can collect the attribute information which is information which cannot specify an individual and is statistical information which can classify a person. Furthermore, the information processing system 1 can specify automatically the personal digital assistant 200 which the user who collected biometrics possesses, and can provide the specified personal digital assistant 200 with countervalue information. As a result, the high information processing method of convenience and an information processing system can be offered.

In addition, with the above-mentioned embodiment, although the information processing equipment 100 compared the 1st attribute information memorized by the 2nd attribute information and storage part 150 received from the personal digital assistant 200 and explained that it was the composition of specifying the personal digital assistant 200 which supplies countervalue information, it is not limited to this composition. The information processing equipment 100 may be the composition of specifying the personal digital assistant 200 which supplies countervalue information, based on distance with the personal digital assistant 200. In this case, the information processing equipment 100 detects the intensity of the electric wave of each personal digital assistant 200 based on the response received from the personal digital assistant 200. For example, the information processing equipment 100 may be composition which supplies countervalue information to the personal digital assistant 200 with the strongest electric wave intensity.

Moreover, the information processing equipment 100 may be of a composition which scores the electric wave intensity and the degree of similarity of the 1st attribute information and the 2nd attribute information, respectively, and supplies countervalue information to the highest-scoring personal digital assistant 200.

Moreover, although the above-mentioned embodiment explained that the information processing equipment 100 was composition which carries out the point which can be used for settlement of accounts instead of money to settlement of accounts with countervalue information, and is supplied to the personal digital assistant 200, it is not limited to this composition. The information processing equipment 100 may be composition which generates discernment information (countervalue information ID) when countervalue information is generated, and supplies generated countervalue information ID to the personal digital assistant 200. In this case, the information processing equipment 100 transmits countervalue information ID and the countervalue information which matched countervalue information ID and countervalue information and were matched with apparatus, such as a server which can be referred to from the settlement system 500. In this case, the settlement system 500 receives countervalue information ID from the personal digital assistant 200, acquires the countervalue information corresponding to received countervalue information ID from the above-mentioned server, and settles accounts using the acquired countervalue information.

Moreover, although the above-mentioned embodiment explained that the information processing equipment 100 was the composition of specifying the personal digital assistant 200 which compares the 1st attribute information with the 2nd attribute information, and supplies countervalue information, it is not limited to this composition.

The information processing equipment 100 may be the composition of specifying the personal digital assistant 200 which supplies countervalue information based on the face feature which was matched with the 1st attribute information and memorized to the storage part 150.

When a demand command is received, the personal digital assistant 200 enciphers the face feature with the 2nd encryption key, and transmits to the information processing equipment 100. Counter value information may be sent to the information processing equipment 100 specified by comparing the primary face information memorized in information processing equipment 100 with the face primary information received from the person digital assistant 200 as well as the composition specified based on the comparison of attribute information.

In addition, although the above-mentioned embodiment explained that the information processing system 1 was composition equipped with at least one or more sets of the information processing equipment 100, the personal digital assistant 200, the server 300, the information provision equipment 400, and the settlement system 500, it is not limited to this composition.

The information processing system 1 does not need to be equipped with the information processing equipment 100, the personal digital assistant 200, the servers 300, the information provision equipment 400, and all the settlement systems 500, or to collects the 1st attribute information. What is necessary is just to equip the personal digital assistant 200 which the user who offered the biometrics used for collection of the 1st attribute information possesses with the composition which supplies countervalue information.

Moreover, although the above-mentioned embodiment explained that the information processing equipment 100 was the composition of specifying the one personal digital assistant 200 and providing the specified personal digital assistant 200 with countervalue information, it is not limited to this composition. The information processing equipment 100 may provide countervalue information to two or more personal digital assistants 200 which exist in the range of the communication part 160 which can be communicated, when attribute information is collected. Moreover, the information processing equipment 100 may provide the personal digital assistant 200 with countervalue information, when it is detected that the personal digital assistant 200 invaded into the range of the communication part 160 which can be communicated.

In addition, the function explained with the form of each above-mentioned enforcement cannot stop at constituting using hardware, but can also be realized by making the program which indicated each function using software read into a computer. Moreover, each function may choose and constitute either software or hardware suitably.

In addition, the present disclosure is not limited to the above-mentioned embodiments, other embodiments are possible without deviating from the invention, for instance, components can be changed or other shapes used. Moreover, various embodiments can be formed with combination with two or more proper components currently indicated by the above-mentioned embodiments. For example, you may delete some components from all the components shown in an embodiment.

Furthermore, you may combine the component covering a different embodiment suitably.

What is claimed is:

1. A method comprising:
acquiring biological information to generate a 1st attribute information from a person, by using a camera, to generate first attribute information, said person having a personal digital assistant;
transmitting a demand command which requests second attribute information to two or more personal digital assistants that are in a predetermined communication range of a communications department;
receiving the 2nd attribute information transmitted from each of the personal digital assistants that has received the demand command by using the communications department;
comparing the acquired 1st attribute information with each of the acquired 2nd attribute information;
computing a degree of similarity between the acquired 1st attribute information and each of the acquired 2nd attribute information;
determining whether any of the personal digital assistants from which each of the 2nd attribute information was acquired has a degree of similarity above a predetermined threshold;
if the degree of similarity is above the threshold, supplying the countervalue information which can be used for settlement of accounts to the personal digital assistant which has the second attribute information determined to have the degree of similarity above the predetermined threshold of the person from which the 1st attribute information was acquired by using the communications department;
reading the countervalue information from memory according to a demand from a settlement system and supplying the countervalue information to the settlement system;
transmitting a demand to the personal digital assistant which has been supplied with the countervalue information, by using the settlement system;
receiving the countervalue information transmitted from the personal digital assistant which has been supplied with the countervalue information and has received the demand, by using the settlement system; and
performing settlement of accounts using the countervalue information, by using the settlement system.

2. The method of claim 1 further comprising:
acquiring receiving an encryption key transmitted from the personal digital assistant of the person from which the 1st attribute information was acquired;
encrypting the countervalue information using the encryption key; and
wherein the supplying countervalue information to the personal digital assistant comprises transmitting the encrypted countervalue information to the personal digital assistant.

3. A method comprising:
acquiring a 1st attribute information from a personal digital assistant belonging to a person;
acquiring 2nd attribute information from each of two or more personal digital assistants;
comparing the acquired 1st attribute information with the each of the acquired 2nd attribute information;
computing a degree of similarity between the acquired 1st attribute information and each of the acquired 2nd attribute information;
determining whether any of the personal digital assistants from which each of the 2nd attribute information was acquired has a degree of similarity above a predetermined threshold;
if the degree of similarity is above the threshold, storing countervalue information in the personal digital assistant from which the 1st attribute information was acquired;
generating analysis information which shows a deviation of attribute of the person for every place which acquired the attribute information;
reading the countervalue information from memory according to a demand from a settlement system and supplying the countervalue information to the settlement system;
transmitting a demand to the personal digital assistant which has stored the countervalue information, by using the settlement system;
receiving the countervalue information transmitted from the personal digital assistant which has stored the countervalue information and has received the demand, by using the settlement system; and performing settlement of accounts using the countervalue information, by using the settlement system.

\* \* \* \* \*